(12) United States Patent
Thomson

(10) Patent No.: US 7,387,198 B2
(45) Date of Patent: Jun. 17, 2008

(54) BALANCED FLAT STROKE BI-DIRECTIONAL CONVEYOR

(75) Inventor: Thomas M. Thomson, Crystal Lake, IL (US)

(73) Assignee: Vibra-Dyn, LLC, Woodstock, IL (US)

( * ) Notice: Subject to any disclaimer, the term of this patent is extended or adjusted under 35 U.S.C. 154(b) by 172 days.

(21) Appl. No.: 11/190,252

(22) Filed: Jul. 27, 2005

(65) Prior Publication Data
US 2005/0258017 A1 Nov. 24, 2005

Related U.S. Application Data

(63) Continuation-in-part of application No. 10/431,220, filed on May 7, 2003, now Pat. No. 6,991,091.

(51) Int. Cl.
*B65G 27/20* (2006.01)

(52) U.S. Cl. ...................................... 198/770; 198/760

(58) Field of Classification Search ................ 198/760, 198/763, 767, 770
See application file for complete search history.

(56) References Cited

U.S. PATENT DOCUMENTS

| | | | |
|---|---|---|---|
| 2,797,796 A * | 7/1957 | Carrier, Jr. et al. ......... | 198/760 |
| 3,301,385 A * | 1/1967 | Lambert ..................... | 198/760 |
| 3,630,342 A * | 12/1971 | Danyluke ................... | 198/570 |
| 3,668,939 A * | 6/1972 | Schrader ....................... | 74/61 |
| 5,040,666 A * | 8/1991 | Patel .......................... | 198/760 |
| 5,056,652 A * | 10/1991 | Kraus et al. ................ | 198/760 |
| 5,064,053 A | 11/1991 | Baker | |
| 5,074,404 A * | 12/1991 | Gonda et al. ............... | 198/757 |
| 5,462,155 A * | 10/1995 | Demar et al. ............... | 198/760 |
| 5,762,176 A | 6/1998 | Patterson et al. | |
| 5,934,446 A | 8/1999 | Thomson | |
| 5,938,001 A | 8/1999 | Turcheck et al. | |
| 5,979,640 A | 11/1999 | Horton et al. | |
| 6,029,796 A * | 2/2000 | Musschoot .................. | 198/753 |
| 6,079,548 A | 6/2000 | Svejkovsky et al. | |
| 6,145,652 A | 11/2000 | Durnil | |
| 6,155,404 A | 12/2000 | Musschoot | |
| 6,269,940 B1 | 8/2001 | Rosenstrom | |
| 6,276,518 B1 | 8/2001 | Wierman | |
| 6,298,978 B1 | 10/2001 | Rosenstrom | |
| 6,398,031 B1 | 6/2002 | Svejkovsky et al. | |
| 6,415,911 B1 | 7/2002 | Svejkovsky et al. | |
| 6,601,695 B1 | 8/2003 | Rosenstrom | |

* cited by examiner

*Primary Examiner*—Mark A Deuble
(74) *Attorney, Agent, or Firm*—Cook, Alex, McFarron, Manzo, Cummings & Mehler, Ltd.

(57) ABSTRACT

A balanced flat stroke bi-directional conveyor for conveying object, granular and powder material. The unit utilizes the skewed sine wave trough stroke principle using primary eccentric counterweights wheels driven by a motor running at the secondary speed and equipped with the secondary eccentric counterweight wheels and a third counterweight wheel. The forces not in line with the trough stroke are absorbed with an isolation spring mounted between the drive assembly and the base, while the forces in line with the trough are balanced via a connected balancer.

4 Claims, 19 Drawing Sheets

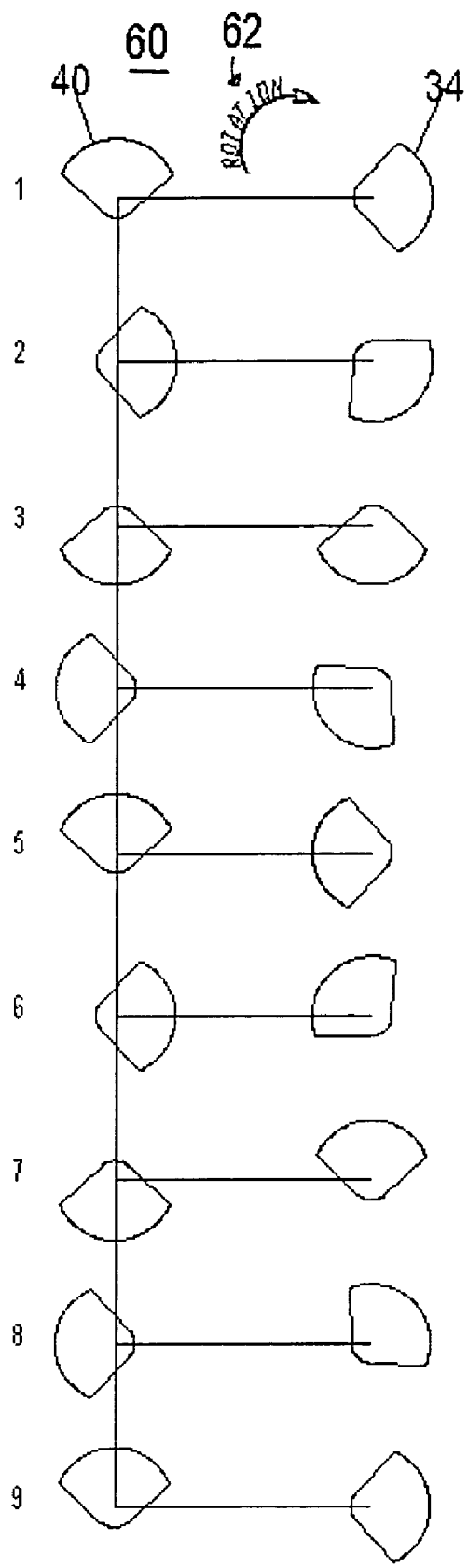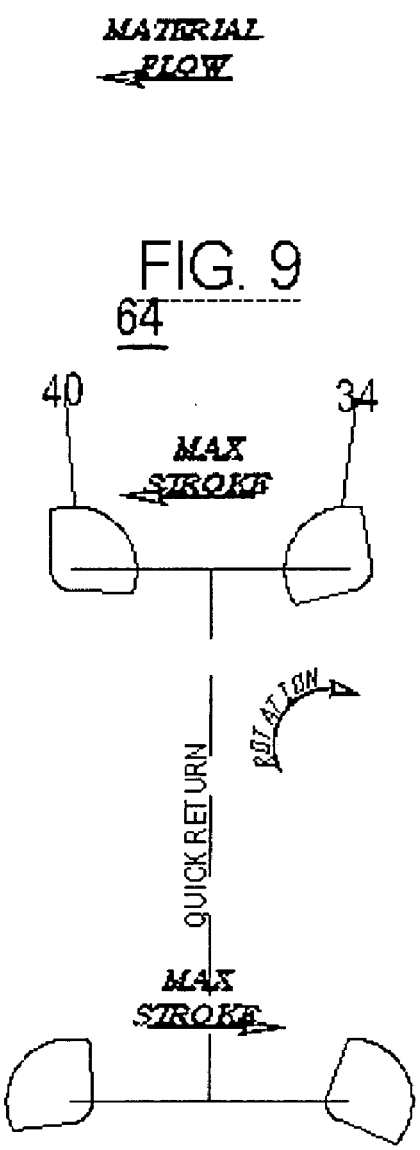
FIG. 9

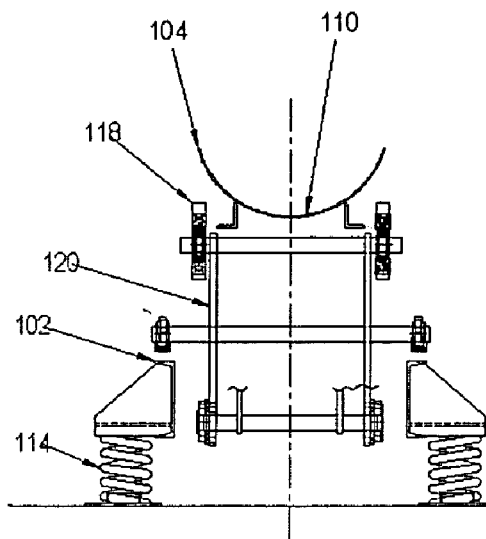
FIG. "14"
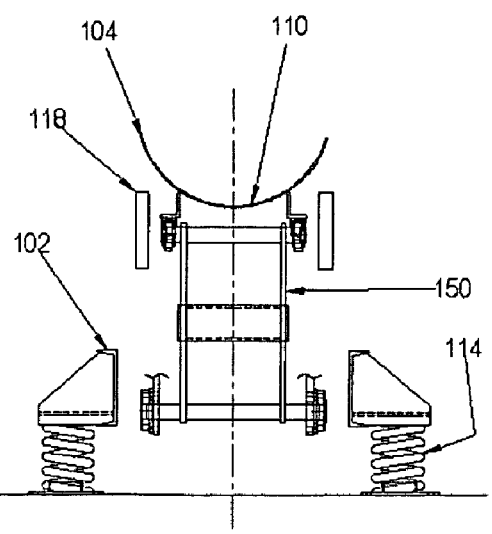
FIG. "15"
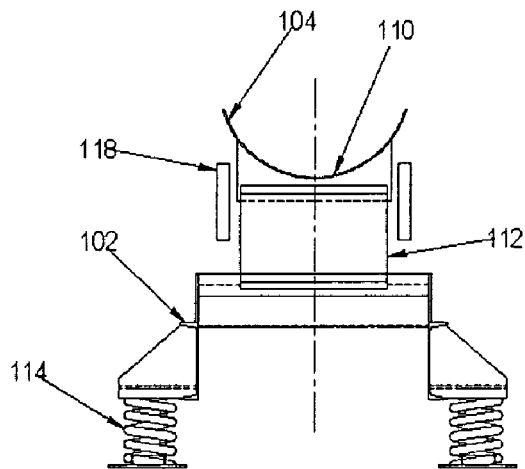
FIG. "16"

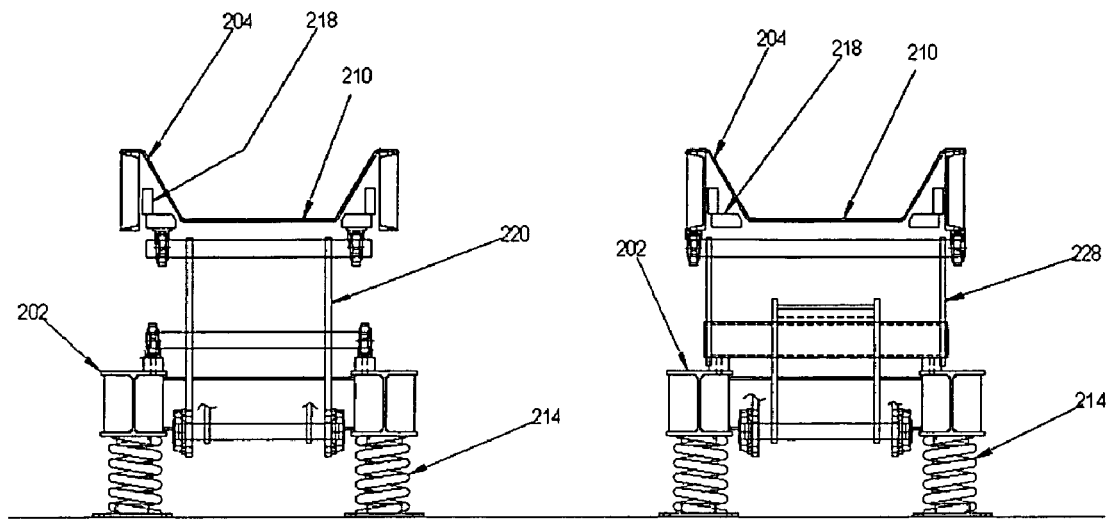
FIG. "18"    FIG. "19"
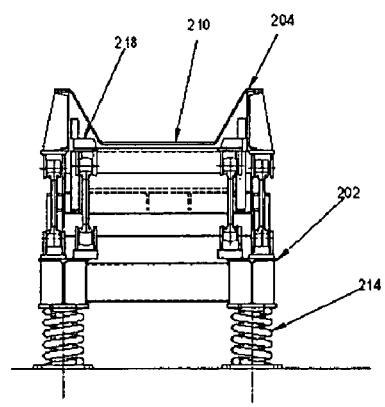
FIG. 20

BALANCED FLAT STROKE BI-DIRECTIONAL CONVEYOR

CROSS-REFERENCE TO RELATED APPLICATIONS

This application is a Continuation-In-Part of application Ser. No. 10/431,220, filed May 7, 2003 now U.S. Pat. No. 6,991,091.

FIELD OF THE INVENTION

The present invention relates to vibrating conveyors, and more particularly, to a vibratory conveyor of the flat stroke design, capable of conveying in both the forward and reverse flow direction.

BACKGROUND OF THE INVENTION

Two-way flat stroke vibratory conveyors or feeders have substantial applications in a variety of fields. One typical application is in foundry operations wherein, for example, foundry castings may be delivered to a conveyor energized to feed the castings to one end or the other, depending upon where it is desired to locate the castings. Another typical application is in the bulk operations of granular materials wherein, for example, sugar, sand, stone, flour, cement, and various other chemical compounds may be delivered to one end or the other in the same way. Additionally, the conveyors may also move combinations of these object, granular and powder materials.

A conventional two-way flat stroke conveyor made according to the prior-art will typically include a motor powered drive system that includes four drive shafts having pairs of eccentric counterweight wheels connected via an elaborate belt connection. This drive is coupled to an elongated bed with an upwardly facing, generally horizontal conveying or feeding surface terminating at opposite ends. In operation the two sets of eccentric counterweight wheels are driven such that the wheels in each set rotate in opposite direction and the two sets are 90° out of phase relative to one another. When the motor powers the drives, a cyclic vibratory force is produced and the output displacement is transferred to the bed to create material flow. If one were to plot the sum of the stroke versus stroke angle of the sets of eccentric counterweight wheels, the result would be a skewed or biased sine wave in the direction of material flow. By reversing the rotation of the system, the skewed sine wave is reversed and the material flow is reversed.

This prior art conveyor poses a number of problems, the greatest of which is the complexity of the drive on what is essentially a brute force system. In other words, as the drive consists of four shafts with pairs of eccentric counterweight wheels, and the wheels, bearings and shafts must be large to transfer the forces, the result is a complex belt drive system with great maintenance and alignment difficulties.

U.S. Pat. No. 5,934,446 to Thomson (incorporated herein by reference) attempts to address these problems with a vibratory conveyor that includes a generally horizontal, elongated conveying surface connected to a base by generally vertically arranged, resilient slats. A drive is mounted to the surface and includes two rotary eccentric shafts coupled in series and set 90° out of phase for vibrating the surface in a generally horizontal direction by imparting a cyclic vibrating force in the form of a skewed sine wave. In other words, the drive, through the connecting drive slats, imparts a horizontal force to the trough, causing it to vibrate in the horizontal direction.

Essentially, the conveyor in the Thomson patent is tuned, through the reactor slats, to approximately 7% above the primary shaft rpm. This design, as such, takes advantage of the sub-resonant natural frequency and reduces the forces to the drive bearings as well as reducing the motor size requirements as compared to the prior art. In other words, the primary horizontal eccentric force and stroke is amplified and the lessor secondary eccentric wheel force is transmitted in a brute force manner, resulting in a smaller skewing stroke component. However, the disadvantage of the Thomson patent remains its drive complexity and space limitation with respect to both manufacture and maintenance costs.

Accordingly, it is a general object of the present invention to provide a new and improved flat stroke bi-directional conveyor.

Another general object of the present invention is to overcome those deficiencies of the flat stroke conveyors of the prior art.

It is a more specific object of the present invention to provide an improved flat stroke bi-directional conveyor which utilizes the skewed sine wave principle to transfer force to the conveying bed.

It is another object of the present invention to provide an improved conveyor which utilizes less and smaller component parts, as compared to current practice, thereby greatly reducing manufacture and maintenance costs.

SUMMARY OF THE INVENTION

A flat stroke conveyor includes a conveyor surface generally coupled to a base by a plurality of resilient supports, and further includes a balance member generally connected to the base by a number of the resilient supports. A drive assembly provides a cyclic vibratory force to the conveying surface in the form of a skewed sine wave while the conveyor is balanced through an independent pivot arm connection of both the conveyor surface and the balancer with the base.

BRIEF DESCRIPTION OF THE DRAWINGS

The features of the present invention which are believed to be novel, are set forth with particularity in the appended claims. The invention, together with the further objects and advantages thereof, may best be understood by reference to the following description taken in conjunction with the accompanying drawings, in the several figures of which like reference numerals identifying like elements, and in which:

FIG. 9 is a depiction of the eccentric counterweight wheel positions every 90° of clockwise rotation of the secondary wheels.

FIG. 14 is a cross-sectional rear view of the b-directional conveyor made according to the principles of the present invention taken along lines 14-14 of FIG. 10.

FIG. 15 is a cross-sectional rear view of the b-directional conveyor made according to the principles of the present invention taken along lines 15-15 of FIG. 10.

FIG. 16 is a cross-sectional rear view of the b-directional conveyor made according to the principles of the present invention taken along lines 16-16 of FIG. 10.

FIG. 18 is a cross-sectional rear view of the b-directional conveyor made according to the principles of the present invention taken along lines 18-18 of FIG. 17.

FIG. 19 is a cross-sectional rear view of the b-directional conveyor made according to the principles of the present invention taken along lines 19-19 of FIG. 17.

FIG. 20 is a cross-sectional rear view of the b-directional conveyor made according to the principles of the present invention taken along lines 20-20 of FIG. 17.

DESCRIPTION OF THE PREFERRED EMBODIMENTS

Figure 1:
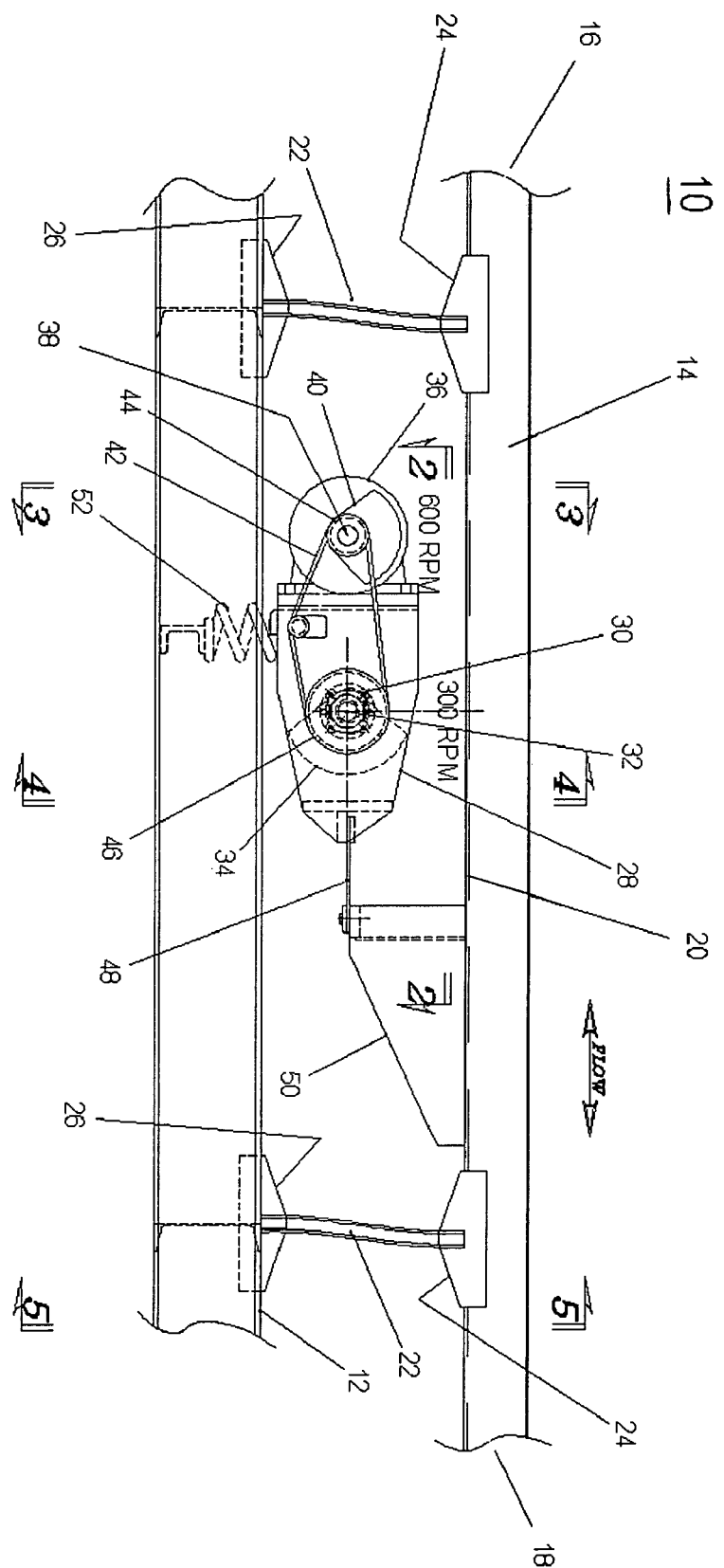
FIG. 1 is a side elevation view of a flat stroke bi-directional conveyor made according to the principles of the present invention with certain parts omitted for clarity purposes.

An exemplary embodiment of a flat stroke bi-directional conveyor or feeder is illustrated in the drawings and will be described herein as a conveyor, it is understood that the terms conveyor and feeder are synonymous for purposes of the present application. Referring now to the drawings, and particularly to FIG. 1, a conveyor 10 constructed in accordance with the invention is seen to basically include a base 12, which may be mounted on the underlying terrain as, for example, the floor of a building, a table structure or the like. Supported about the base 12 is a generally horizontal, elongated, trough 14 having opposed ends 16 and 18, as well as an lower conveying surface 20. The trough 14 is supported about the base 12 by a series of vertically arrayed, vertical resiliency members 22, for example a rocker leg and coil spring combination, or, preferably vertical leaf spring slats of conventional construction that are secured to both the underside of the trough 14 and to the base 12 at spaced locations via fabricated structural brackets 24 and fabricated brackets 26 respectively.

Figure 2:
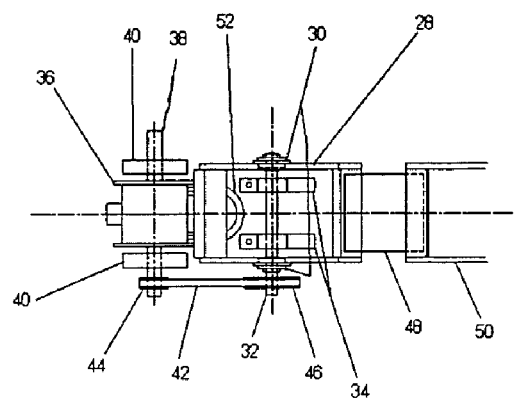
FIG. 2 is a cross-sectional top plan view of the bi-directional conveyor made according to the principles of the present invention taken along lines 2-2 of FIG. 1.

The drive assembly, FIG. 2, consists of a structural drive fabricated horizontal rectangular box 28 and is preferably opened at the top and bottom. Two flange bearings 30 are mounted on each longitudinal side holding a lateral drive shaft 32 which in turn supports two primary eccentric counterweights 34. A preferably totally enclosed and non-ventilated heavy duty reversible shaker motor 36 is bolted at one end of the drive box 28 so that the motor shaft 38 is lateral and horizontal to the elongated trough 14. Two secondary eccentric counterweights 40 are mounted on the motor shaft 38. The two primary eccentric counterweights 32 are driven by a synchronous timing belt 42 and driver and driven sprocket system are respectively longitudinally aligned whereby the driver sheave 44 is mounted on the motor shaft 38 and the driven sheave 46 is mounted on the primary drive shaft 32. The drive assembly is attached to the trough 14 with a horizontal resiliency member 48, preferably a leaf spring slat connected to the drive at the opposite end of the drive motor 36 and attached to a trough drive bracket 50 that is in turn connected to the trough 14. Lastly, a spring 52 is connected to the bottom side of the drive and at the opposite end to the base 12.

Figures 3, 4:
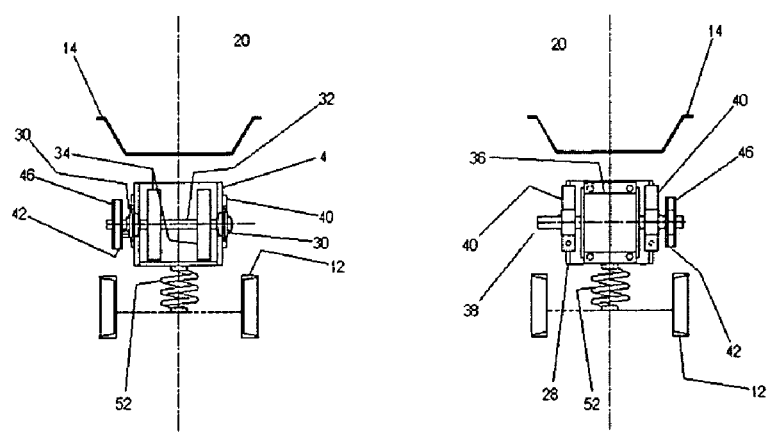
FIG. 3 is a cross-sectional frontal view of the bi-directional conveyor made according to the principles of the present invention taken along lines 3-3 of FIG. 1.
FIG. 4 is a cross-sectional rear view of the bi-directional conveyor made according to the principles of the present invention taken along lines 4-4 of FIG. 1.

Thus far, FIGS. 1 and 2 have been shown and described to give the overall look and general structure of the principle components of the present invention. Turning now to the cross-setional views of FIGS. 3-5, the functional aspects of the principle components of the present invention are shown and described. Referring to FIG. 3, the front of the drive assembly is shown with respect to its position above the base 12 and beneath the trough 14 as supported by the spring 52. Within the drive box 28 is the shaker motor 36 which drives motor shaft 38. The two secondary eccentric counterweights 40 rotate about the shaft 38 upon the motor 36 generating rotational power to the shaft 38. Also, coupled to and rotating with the motor shaft 38 is the driver sheave 44. The driver sheave 44 in turn rotates the driven sheave 46 through timing belt 42. In the preferred embodiment, the driven sheave 46 is preferably twice the diameter of the driver sheave 44, thereby causing the primary eccentric counterweights 34 to rotate at half the speed of the secondary eccentric counterweights 40. Although, multiple combinations may provide the desired results, these speeds of rotation are preferably 300 r.p.m. and 600 r.p.m. respectively.

Referring now to FIG. 4, the rear of the drive assembly is shown with respect to its positions above the base 12 and beneath the trough 14 as supported by the spring 52. The previously discussed rotation of the driven sheave 46 in turn rotates the lateral drive shaft 32, which is supported within the drive box 28 by flange bearings 30, thereby causing the two primary eccentric counterweights 34 to rotate about the drive shaft 32. The primary eccentric counterweights 34 and the secondary eccentric counterweights 40 are timed so that the primary eccentric counterweights 34 are horizontal when the secondary eccentric counterweights 40 are vertical i.e. lag the primary eccentric counterweights by 90°. The spring 52 illustrated in FIGS. 1-4 as being connected to the bottom side of the drive assembly and the opposite end connected to the base 12 serves a dual purpose. First, the spring 52 is sized to isolate and help support the drive assembly from the base 12 and accordingly nearly eliminates the vertically induced forces transmitted to the ground. In other words, the forces of the wheels not in line with the trough stroke (infra) are absorbed via this spring. Second, the spring 52 supports the drive assembly weight in order to relieve pre-loading the horizontal leaf spring slat 48.

Figure 5:
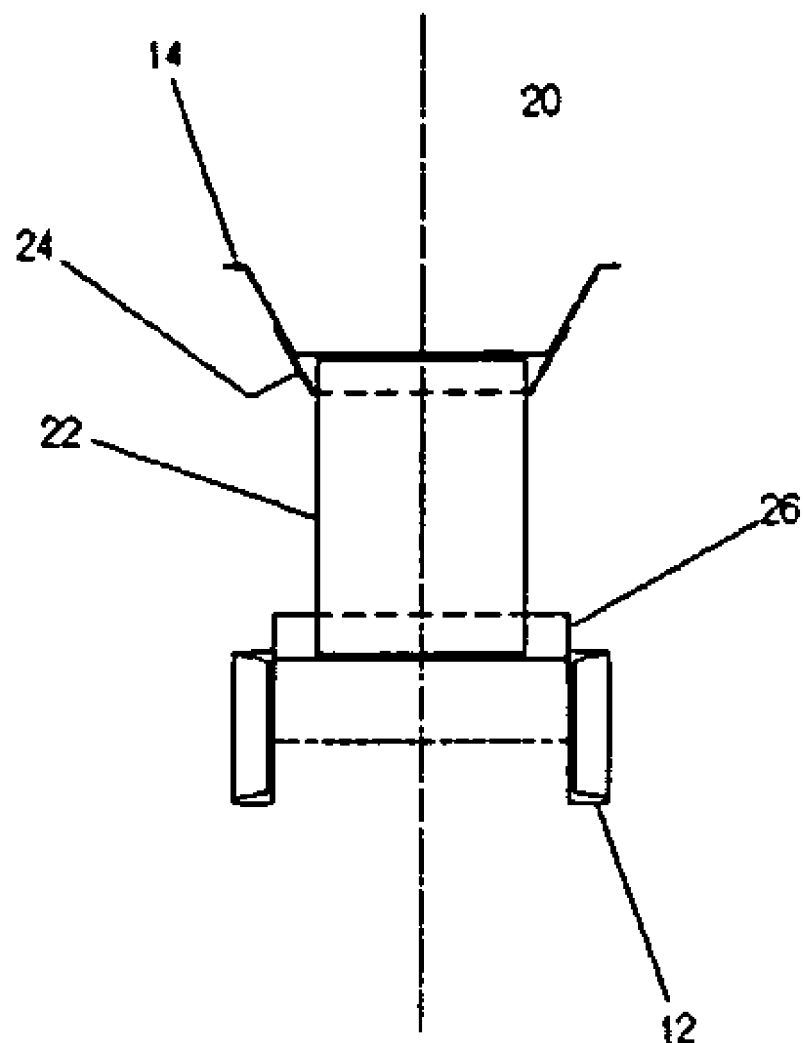
FIG. 5 is a cross-sectional rear view of the bi-directional conveyor made according to the principles of the present invention taken along lines 5-5 of FIG. 1.

Finally, FIG. 5 illustrates the coupling of the base 12 and the trough 14 through the leaf spring slats 22 that are connected thereto by fabricated structural brackets 24 and fabricated brackets 26 respectively. These leaf spring slats 22 are sized so that the total spring rate sets the single mass natural frequency of the elongated trough 14 mass at preferably about seven percent (7%) over the primary running frequency. Furthermore, the leaf spring slats 22 are positioned vertically with respect to the base 12 and trough 14 so that the direction of the vibratory motion is horizontal and parallel to the elongated trough 14.

Figure 6:
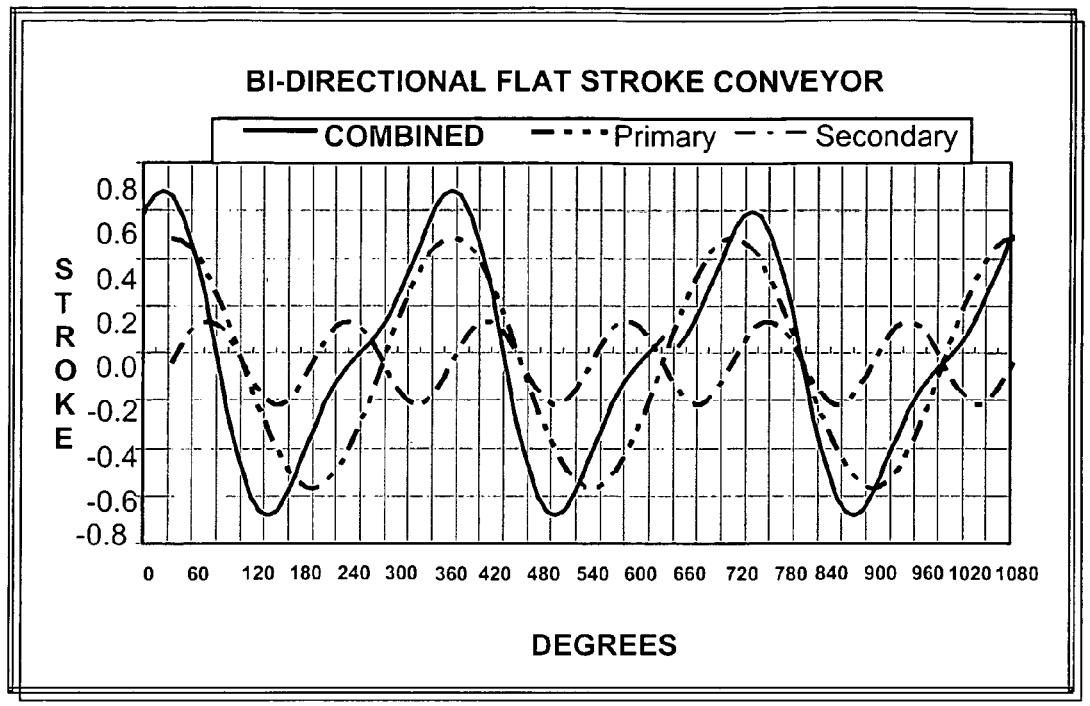
FIG. 6 is a graph plotting stroke versus stroke angle of the primary and secondary counterweights as well as the combined sum of the two frequencies showing the skewed sinusoidal stroke.

With the general structure and function of the component parts shown and described with respect to FIGS. 1-5, FIGS. 6-9 are now discussed as they relate to the general operation of the present invention. During operation and when the motor 36 is turned on to rotate the motor shaft 38 in a counter-clockwise manner, the secondary eccentric counterweights 40 and the primary eccentric counterweights 34 transfer energy through the horizontal leaf spring slat 48, the trough drive bracket 50, and ultimately the trough 14 in the form of a modified sinusoidal skewed stroke pattern as shown in FIG. 6. This stroke pattern has been termed a "skewed sine wave" in that the slope of one side of each wave is shallower than the slope of the other side of the wave. Thus, if the stroke pattern illustrated by FIG. 6 is being applied to the components in the manner illustrated in FIGS. 1-5, movement of the trough 14 to the right, that is toward the end 18, will be relatively slow while the return movement toward the other end 16 will be relatively fast. In this case, conveying will be to the right because the slow movement to the right will allow the material being conveyed to frictionally engage and be advanced in that direction by the conveying surface 20 of the trough 14. On the other hand, the fact that the return is so rapid, and the fact that the material still contains momentum energy from the rightward stroke will result in little or no reverse movement during the return stroke. The net result will be conveying of the material to the right.

Figure 7:
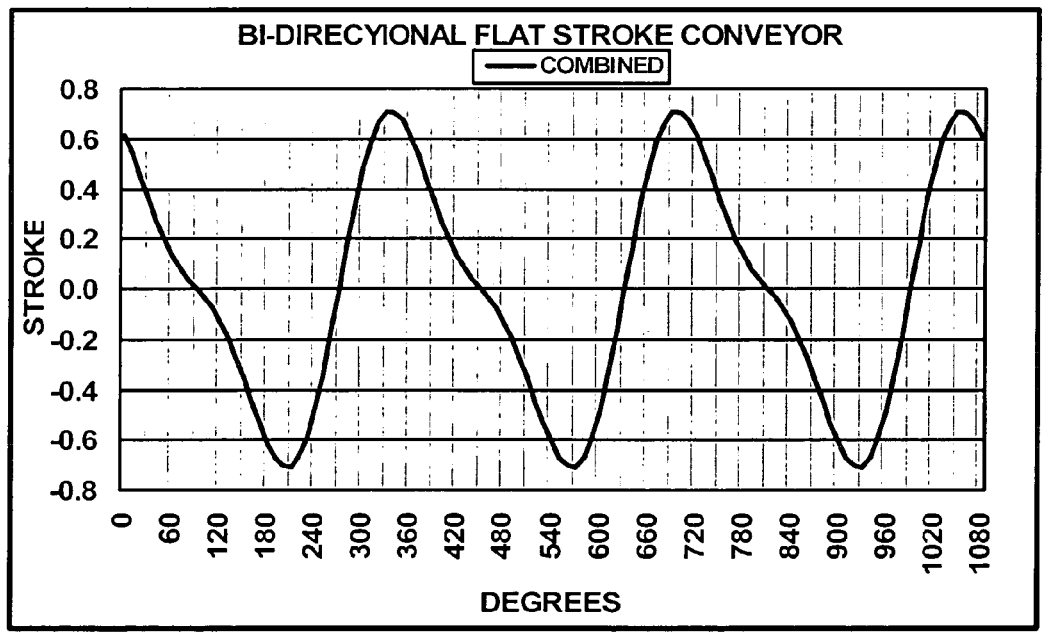
FIG. 7 is a graph of the combined sum of the two frequencies of FIG. 6 when the motor rotation is reversed.

When the operation is as in FIG. 7, the opposite will occur. By reversing the motor rotation, the sinusoidal skewed stroke is biased to the left and the material flow is reversed to the left. As above, but stated differently, the stroke is skewed, now to the left, so that the trough movement to the left takes approximately twice the time which results in a low enough acceleration force, to promote material conveyance during the portion of the cycle as the return movement to the right does. The result is a biased impulse to the left causing material on the trough to be conveyed to the left.

As shown and described, it is the transfer of energy of the counterweights to the trough that produces the material flow. The present invention provides this forward material flow because the eccentric counterweight wheels are aligned such that the secondary wheels lag the primary wheels by 90° when the primary wheels are in line with the line of action of the trough stroke. The 90° offset fixed eccentric counterweight wheels are further capable of producing reverse material flow because the offset run in the opposite direction changes from a lagging profile to a leading profile resulting in reversing the skewed sinusoidal stroke.

Figure 8:
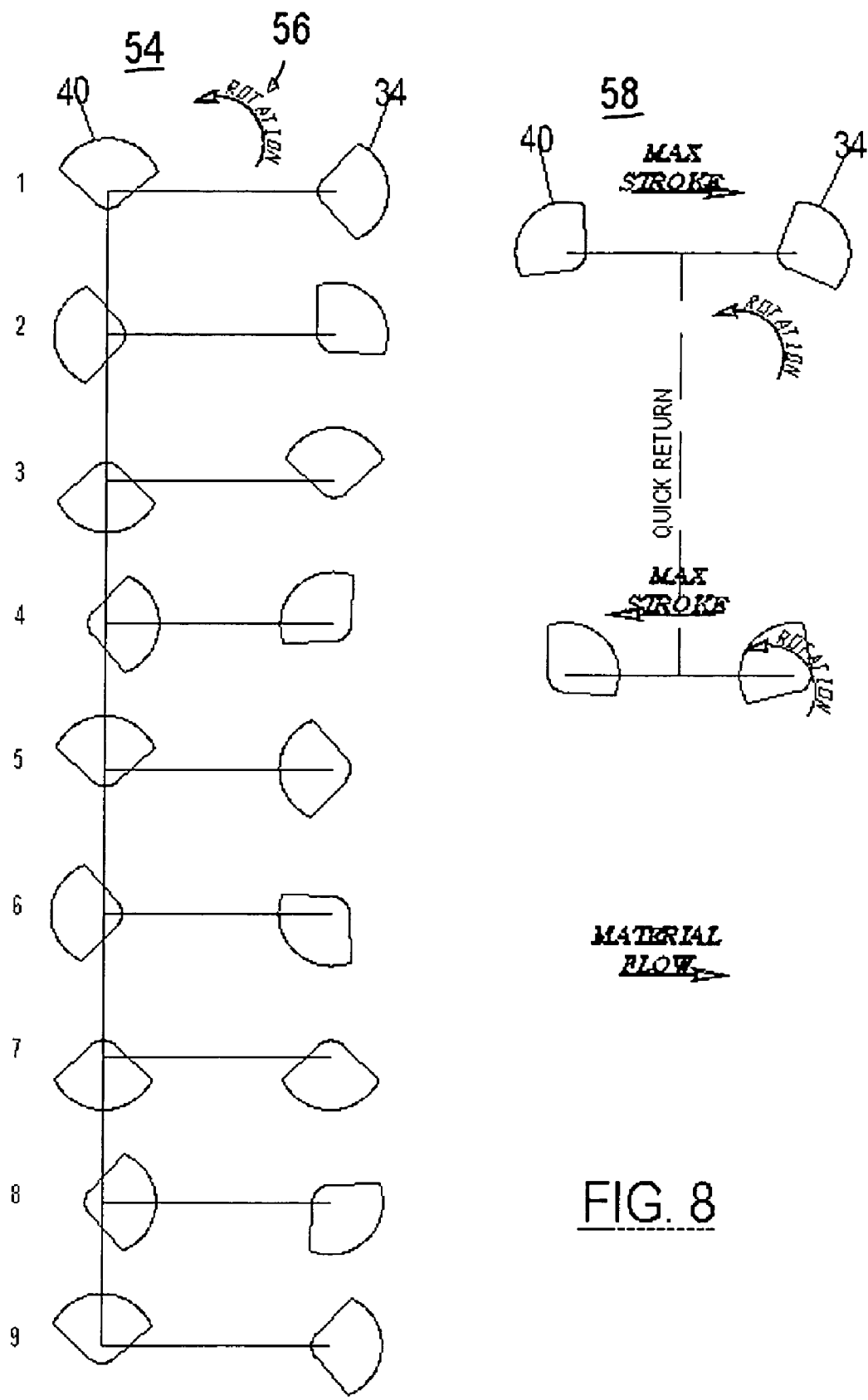
FIG. 8 is a depiction of the eccentric counterweight wheel positions every 90° of counter-clockwise rotation of the secondary wheels.

This lagging/leading 90° offset is best illustrated with respect to FIGS. 8 and 9 respectively. FIG. 8 shows a step-wise representation 54 of the relative positions of the primary 34 and secondary 40 eccentric counterweights for every 90° counter-clockwise rotation 56 of the secondary eccentric counterweights 40. The phase illustration 58 to the right of the nine-step series 54 shows the positions of the wheels where the maximum strokes occur when the material flow is from left to right. Similarly, FIG. 9 shows a step wise representation 60 of the relative positions of the primary 34 and secondary 40 eccentric counterweights for every 90° clockwise rotation 62 of the secondary eccentric counterweights 40. The phase illustration 64 to the right of the nine-step series 60 shows the positions of the wheels where the maximum strokes occur when the material flow is from right to left.

From the foregoing, it will be appreciated that a flat stroke bi-directional vibratory conveyor made according to the invention produces a number of advantages over the prior art apparatus. For one, wheel sizes are greatly reduced without loss of stroke force. More particularly, the present invention utilizes a 2:1 frequency ratio and a 1:3 eccentric force ratio that results in the wheel sizes to be [(2×2)×1]:[1×3] or a 4:3 ratio for wheel size. Furthermore, the size of the wheels are even smaller because the present invention's lower frequency stroke is amplified by the sub-resonant tuned frequency of the trough, thereby further reducing the 4:3 ratio to around 1.75:3 ratio. In other words, by adapting the motor to the secondary frequency, motor eccentric counterweight wheels are small, and further, the primary eccentric counterweight wheels are minimized because of the sub-resonant tuning of the conveyor.

By way of example, assume that the conveyor trough natural frequency is set to be around 7% above the primary frequency. So, if the primary frequency is 300 rpm then the trough frequency is set to 320 rpm. The combined result is that the primary running frequency of 300 rpm is amplified as a sub-resonant natural frequency single mass conveyor system. The primary and secondary counterweight wheels have approximately the same brute force stroke. Because the primary natural frequency is close to the primary running speed, the trough stroke amplifies by a factor of about three times the brute force stroke.

Figure 10:
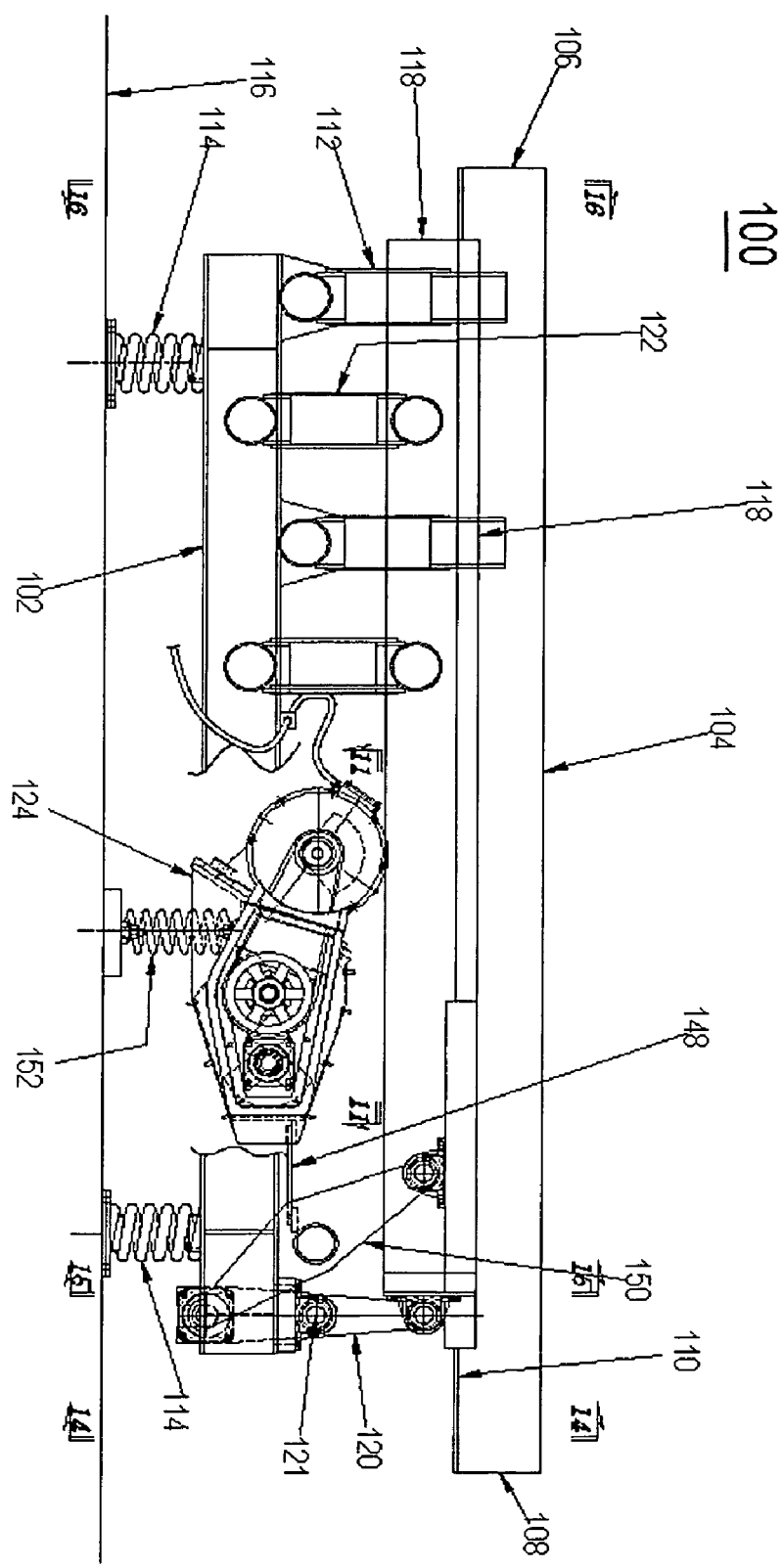
FIG. 10 is a side elevation view of an alternate embodiment of a flat stroke bi-directional conveyor made according to the principles of the present invention with certain parts omitted for clarity purposes.

An alternative embodiment incorporating the principles of the present invention will now be described with respect to FIGS. 10-26. Turning first to FIG. 10, a conveyor 100 constructed in accordance with the invention is seen to basically include a base 102, which may be mounted on the underlying terrain as, for example, the floor of a building, a table structure or the like. Supported about the base 102 is a generally horizontal, elongated, trough 104 having opposed ends 106, 108, as well as an upper conveying surface 110. The trough 104 is supported about the base 102 through slat reactor springs 112. The base frame 102 can be mounted securely to the ground, or preferably it may be isolated via isolation springs 114 from the base frame 102 to the ground or support surface 116. In addition, a balancer 118 is driven 180° opposite the trough 104 by a pivot arm 120 connected to the base 102. The resulting force through reactor springs 112 and balancer reactor springs 122 is zero, and, accordingly this results in no force being transmitted to the base 102.

Figure 11:
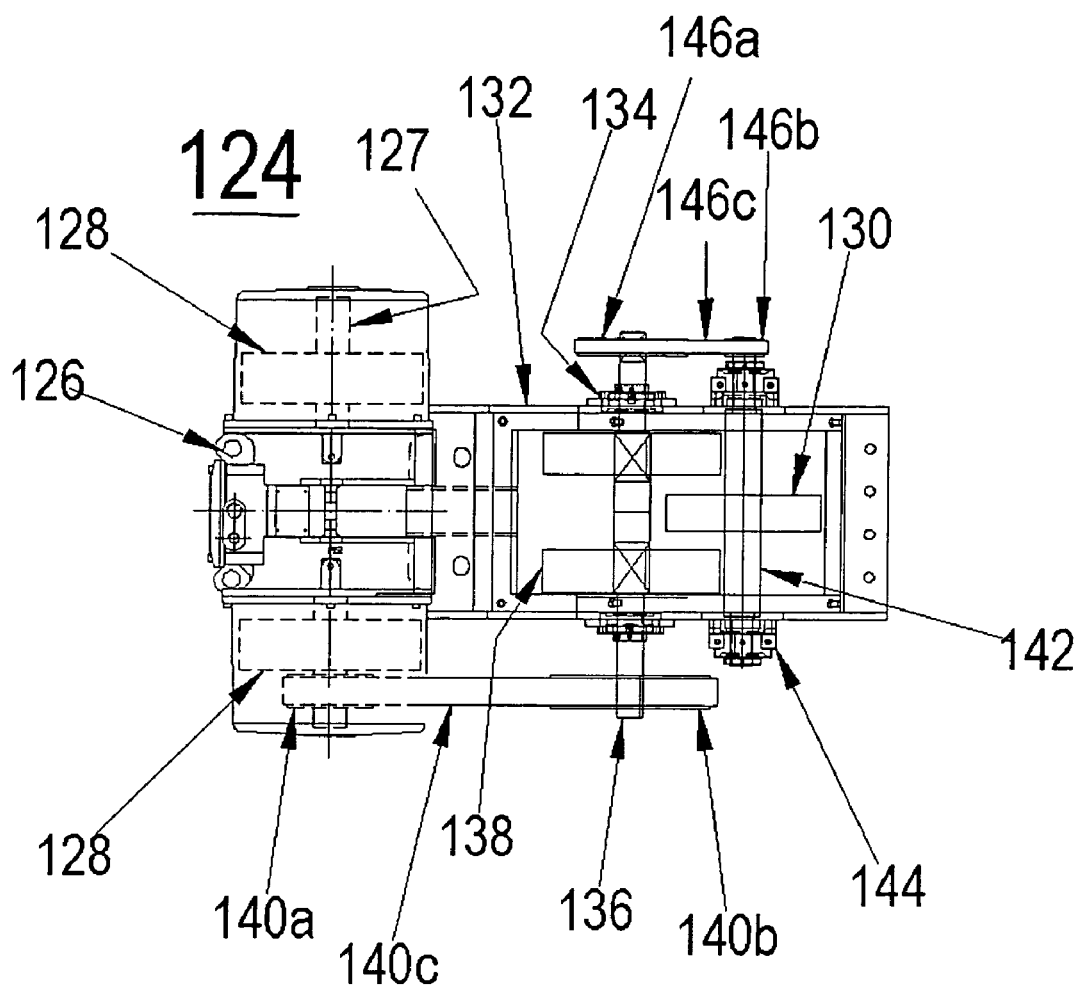
FIG. 11 is a cross-sectional top plan view of the bi-directional conveyor made according to the principles of the present invention taken along lines 11-11 of FIG. 10.
Figure 12A:
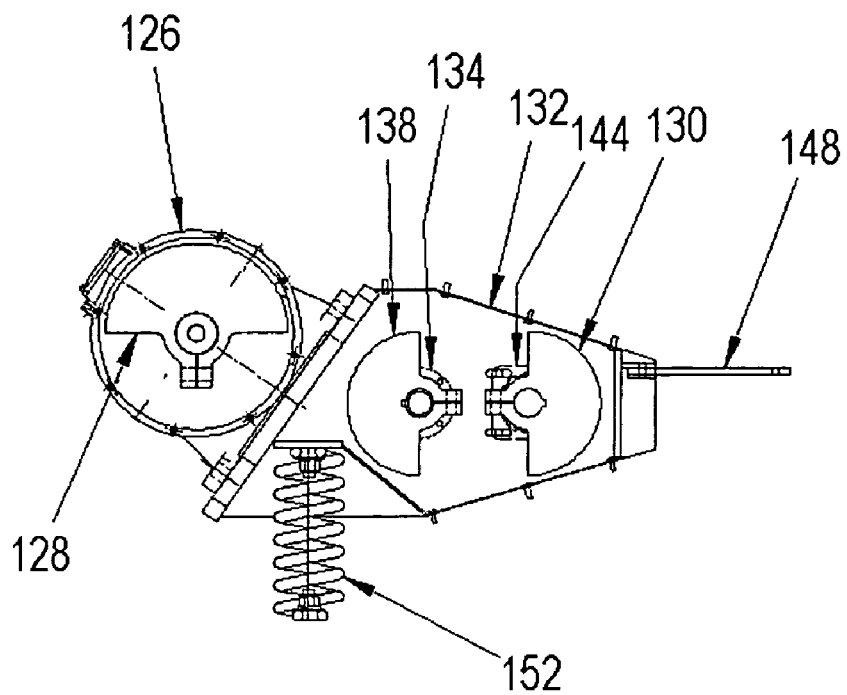
FIG. 12*a* is a side elevation view of the drive assembly of FIG. 10 shown with counterweight wheels arranged for reverse rotation creating reverse material flow.

The drive assembly 124, FIGS. 11 and 12a, preferably consists of a heavy duty shaker motor 126 with secondary counterweights 128 and a third counterweight 130 mounted to the drive frame 132. The drive frame 132 holds primary counterweight wheels 138 and a rotating shaft 136 supported with flange bearings 134 bolted to the frame. A sheave and timing belt system 140a, 140b and 140c drives the primary counterweights 138 at half the speed of the motor 126 and 90° out of phase with the secondary counterweights 128. The drive frame 132 holds the third counterweight wheel 130 and a rotating shaft 142 supported with flange bearings 144 bolted to the frame. A sheave and timing belt system 146a, 146b and 146c drives the third counterweight 130 at 1½ the speed of motor 126 and 90° out of phase with the secondary counterweights 128.

The drive assembly 124 is connected to the trough 104 with a drive slat 148. The slat 148 act as a pinned connection to the trough floating arm 150 allowing the drive assembly 124 to pivot 90° to the line of action of the trough motion thus allowing the drive in said direction to be isolated with the combination of the drive slat 148 and the coil spring 152.

Figure 12B:
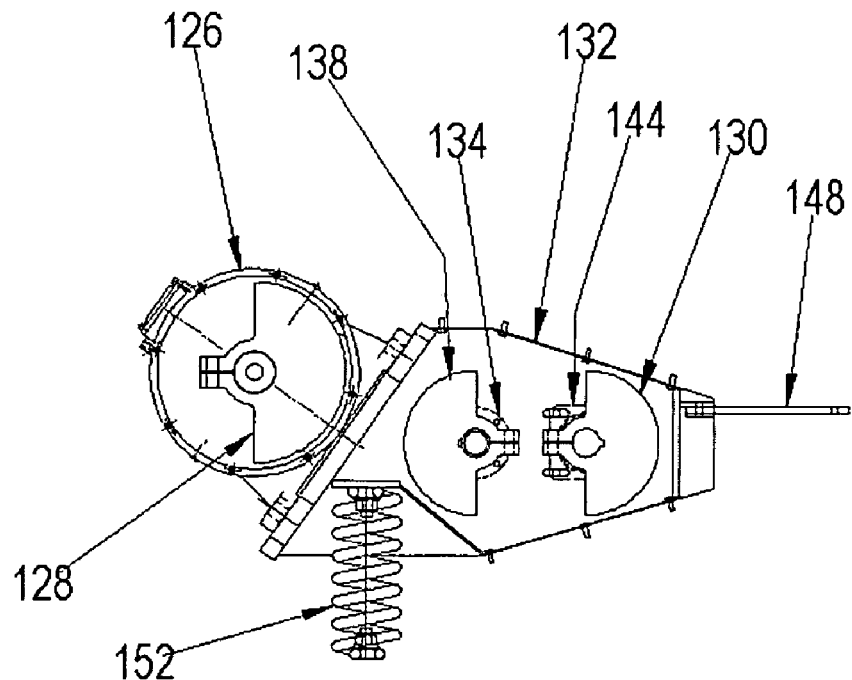
FIG. 12*b* is a side elevation view of the drive assembly of FIG. 10 shown with counterweight wheels arranged for maximum flow rate and no reverse flow by reversing rotation.
Figure 13:
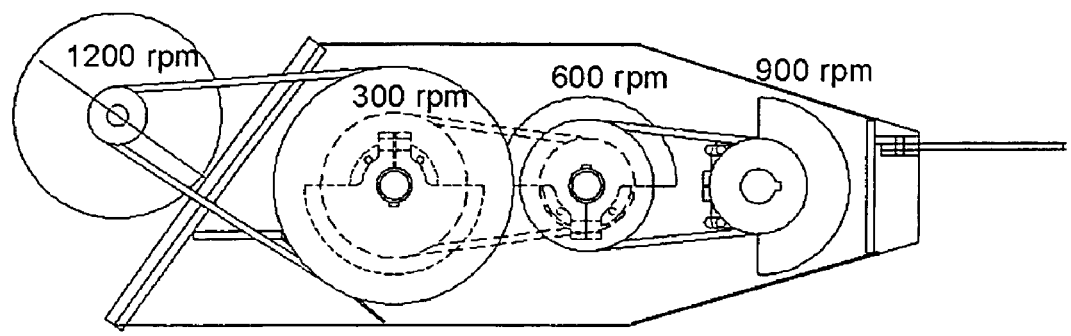
FIG. 13 is a side elevation view of an alternate drive assembly shown with a conventional TEFC motor.

Although the wheel and drive arrangement have been shown and described in the preferred embodiment of FIGS. 11 and 12a, it will be understood that alternate wheel and drive arrangements can be utilized through the teachings of the present invention. For example, FIG. 12b shows an alternate wheel arrangement which increases material travel speed for the same stroke as the wheel arrangement in FIG. 12a, but does not allow the reversal of motor rotation to reverse direction of material travel. Additionally, FIG. 13 shows an alternate drive arrangement that replaces the shaker motor with a conventional TEFC motor. This requires an additional shaft and bearings, plus another set of sheave and belt hardware over the previously described drive, but does not restrict the size of the motor, and hence the drive.

FIGS. 14-16 show cross-sectional views taken along FIG. 10 to better illustrate some of the component parts of the conveyor 100. More particularly, FIG. 15 is an end view section of drive connection showing the end view of the floating drive arm 150; FIG. 14 is an end view section of connection showing the balancer driver arm 120; and FIG. 16 is an end view section of the trough slat reactor spring.

FIGS. 10-16 have shown and described the alternate embodiment of the present invention having the trough mounted to the base with slat reactor springs. However, other means to mount the trough to the base have been contemplated, and, for example, FIGS. 17-20 illustrate the use of coil reactor springs. More particularly, and turning to FIG. 17, a conveyor 200 constructed in accordance with the invention is seen to basically include a base 202, which may be mounted on the underlying terrain as, for example, the floor of a building, a table structure or the like. Supported about the base 202 is a generally horizontal, elongated, trough 204 having opposed ends 206, 208, as well as an upper conveying surface 210. The trough 204 is supported about the base 202 through coil reactor springs 212. The base frame 202 can be mounted securely to the ground, or preferably it may be isolated via isolation springs 214 from the base frame 202 to the ground or support surface 216. In addition, a balancer 218 is driven 180° opposite the trough 204 by a pivot arm 220 and pinned legs 221 connected to the base 202. The resulting force through trough reactor springs 212 and balancer reactor springs 222 is zero, and, accordingly this results in no force being transmitted to the base 202.

The drive assembly 224 is connected to the trough 204 with a drive slat 226. The drive slat 226 acts as a pinned connection to the trough floating arm 228 allowing the drive assembly 224 to pivot 90° to the line of action of the trough motion thus allowing the drive in said direction to be isolated with the combination of the drive slat 226 and the coil spring 230.

Whether the conveyor of the alternate preferred embodiment utilizes the reactor springs 112 and balancer reactor springs 122 structure (as in FIG. 10), or the reactor springs 212 and the balancer reactor springs 222 structure (as in FIG. 17), due to the balancer arrangement, there is no resultant force being transmitted to the base. More specifically, and referring to FIG. 10, a trough 104, balancer 118, base 102, and drive assembly 124 connected with reactor springs 122 independently connecting both the trough 104 and the balancer 118 with the base 102. Each connected system can only move in a direction horizontal or parallel to the base 102. The drive is connected to a drive coupling arm (or trough floating arm) 150 with a flexible drive plate and isolated to the ground with a drive isolation spring 152. The tough coupling arm (or pivot arm) 120 is secured to the base pivot connection 121 approximately at the mid-point, vertical to the trough, and connected, with pivot connections, to the trough 104 at one end and the floating drive coupling arm 150 at the other end. The base is mounted on base isolation springs 114 and is horizontal with the ground. The trough reactor springs 112 between the trough 104 and the base 102 are sized so that their total spring rate sets the single mass natural frequency, assuming the base as rigid, and the weight of the elongated trough is such that the single mass natural frequency is above the primary running frequency. The balancer reactor springs 122 are sized so that their total spring rate sets the single mass natural frequency of the combined weight of the drive and elongated balancer, also assuming the base as rigid, above the primary running frequency. Accordingly, the moment of the base created between the trough center of gravity and the trough reactor springs and the moment created on the base between the balancer center of gravity and balancer reactor springs is approximately equal and opposite.

Figure 17:
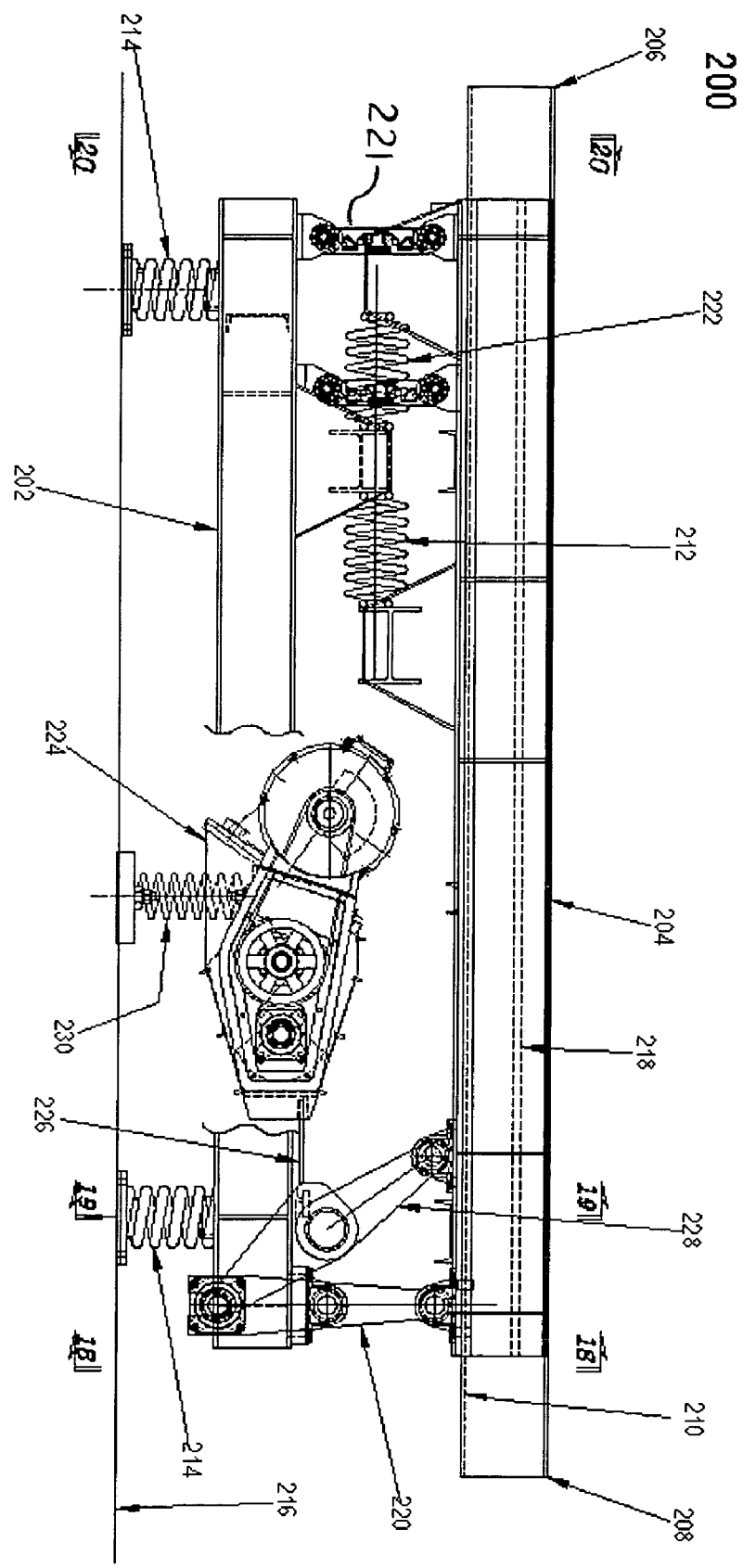
FIG. 17 is side elevation view of an alternate embodiment of a flat stroke bi-directional conveyor made according to the principles of the present invention with certain parts omitted for clarity purposes.

FIGS. 18-20 show cross-sectional views taken along FIG. 17 to better illustrate some of the component parts of the conveyor 200. More particularly, FIG. 19 is an end view section of drive connection showing the end view of the floating device arm 228; FIG. 18 is an end view section of connection showing the balancer driver arm 220; and FIG. 20 is an end view section of the coil reactor spring brackets and also trough and balancer pivot arms (pinned legs).

Figure 21A:
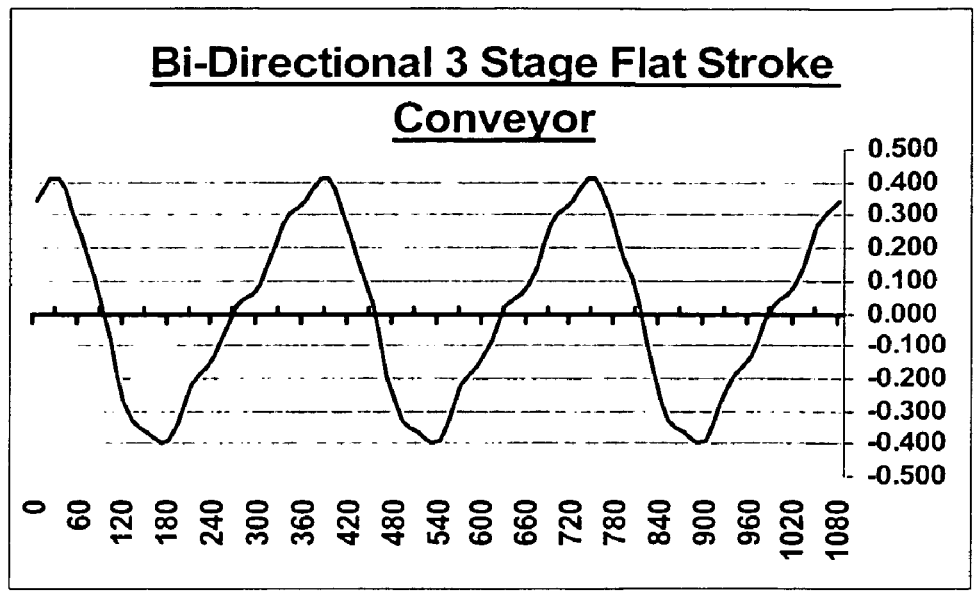
FIG. 21 is a graph plotting stroke versus stroke angle of wheels arranged for reverse rotation/reverse flow.

With the general structure and function of the component parts of the alternate embodiments shown and described with respect to FIGS. 10-20, FIGS. 21-26 are now discussed as they relate to the general operation of the alternate preferred embodiments of the present invention. During operation and when the motor 126 is turned on to rotate the motor shaft 127 in a counter-clockwise manner, the secondary counterweights 128, the third counterweight 130 and the primary counterweights 138 transfer energy through the drive slats 148, the trough floating arm 150, and ultimately the trough 104 in the form of the modified sinusoidal skewed stroke pattern as shown in FIG. 21a. This stroke pattern has been termed a "skewed sine wave" in that the slope of one side of each wave is shallower than the slope of the other side of the wave. Thus if the stroke pattern of FIG. 21a is being applied to the components in the manner illustrated in FIGS. 10-20, movement of the trough 104 to the right, that is towards the end 108, will be relatively slow while the return movement toward the other end 106 will be relatively fast. In this case, conveying will be to the right because the slow movement to the right will allow the material being conveyed to frictionally engage and be advanced in that direction by the conveying surface 110 of the trough 104. On the other hand, the fact that the return is so rapid, and the fact that the material still contains momentum energy from the rightward stroke will result in little or no reverse movement during the return stroke. The net result would be conveying of the material to the right.

Figure 21B:
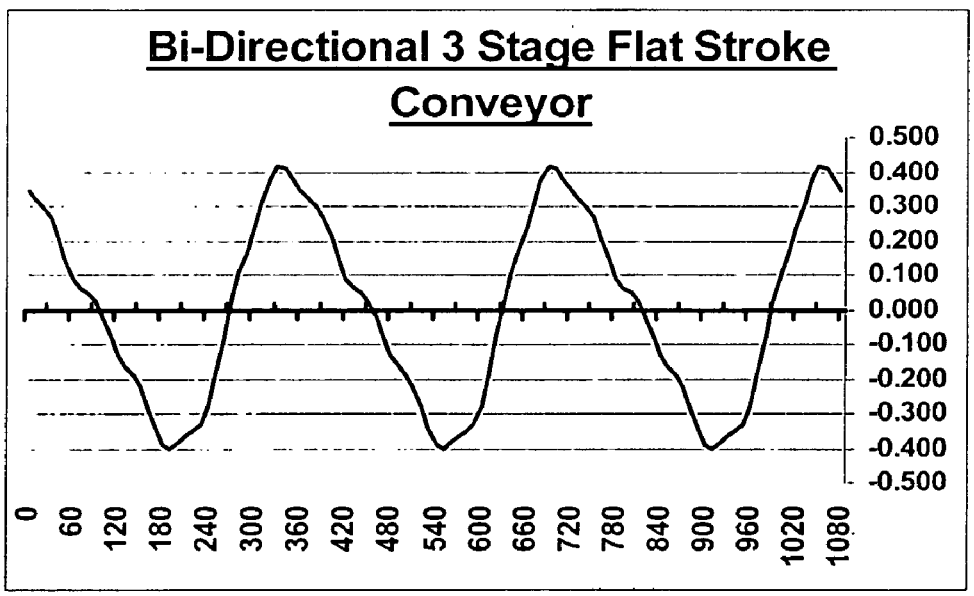

When the operation is as FIG. 21b, the opposite will occur. By reversing the motor rotation, the sinusoidal skewed stroke is biased to the left and the material flow is reversed to the left. As above, but stated differently, the stroke is skewed, now to the left, so that the trough movement to the left takes approximately twice the time which results in a low enough acceleration force, to promote material conveyance during the portion of the cycle as the return movement to the right does. The result is a biased impulse to the left causing material on the trough to be conveyed to the left.

Figure 22A:
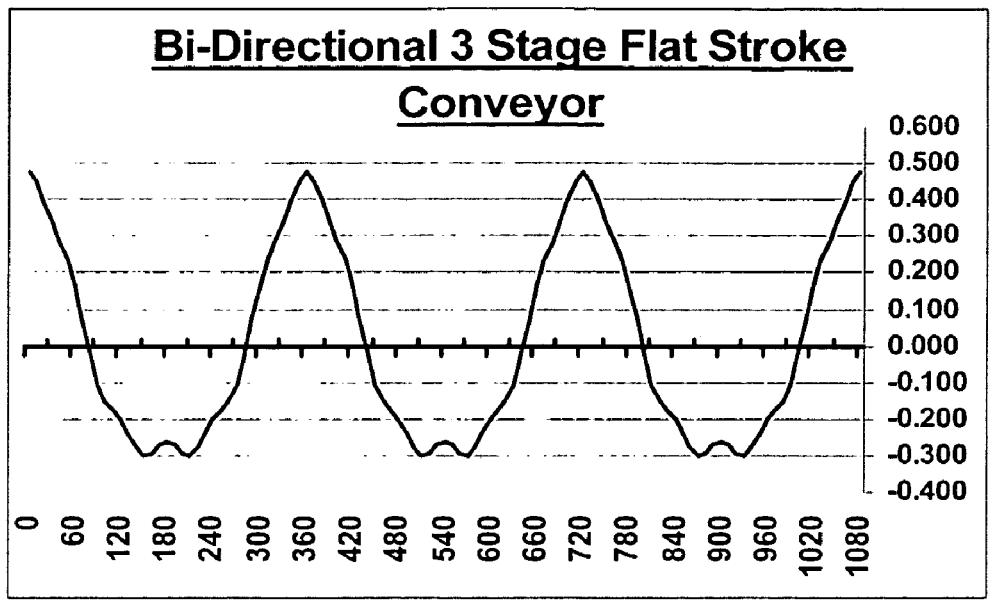
FIG. 22 is a graph plotting stroke versus stroke angle of wheels arranged for maximum flow regardless of rotation.
Figure 22B:
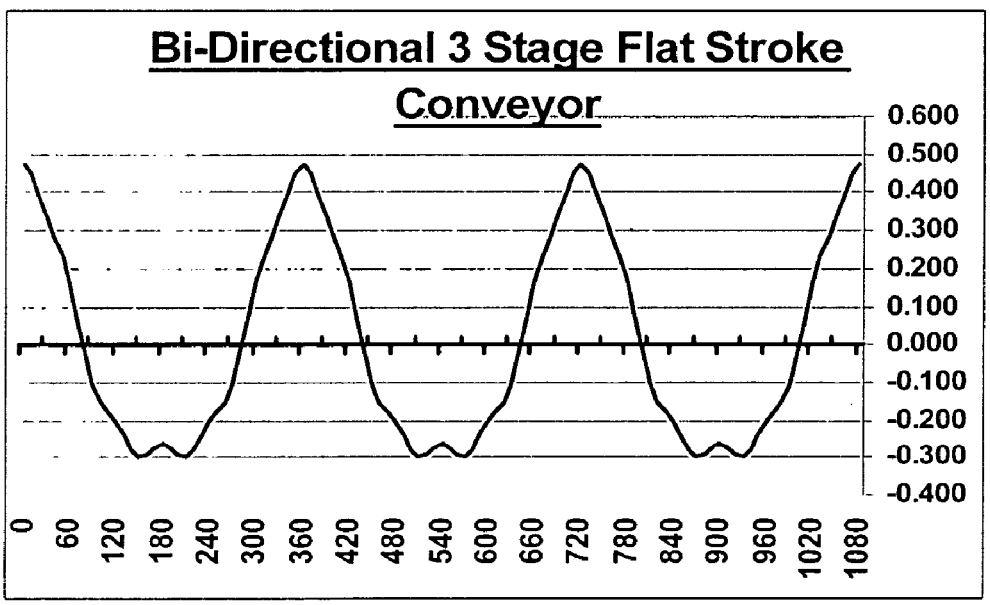

FIG. 22 is a graphical interpretation of stroke versus time of wheels arranged for maximum flow regardless of rotation. In other words, as FIG. 21 relates to the wheel arrangement of FIGS. 10, 12a and 17, FIG. 22 relates to the wheel arrangement of FIG. 12b.

As shown and described, it is the transfer of energy of the counterweights to the trough that produces the material flow. The alternate embodiments of the present invention provide this forward material flow because the eccentric counterweight wheels are aligned such that the secondary wheels lag the primary wheels by 90° and the third wheel lags the primary wheels by 180° when the primary wheels are in line with the line of action of the trough stroke. The 90° and 180° offset wheels are further capable of producing reverse material flow because the offset run in the opposite direction changes from a lagging profile to a leading profile resulting in reversing the skewed sinusoidal stroke.

Figure 23:
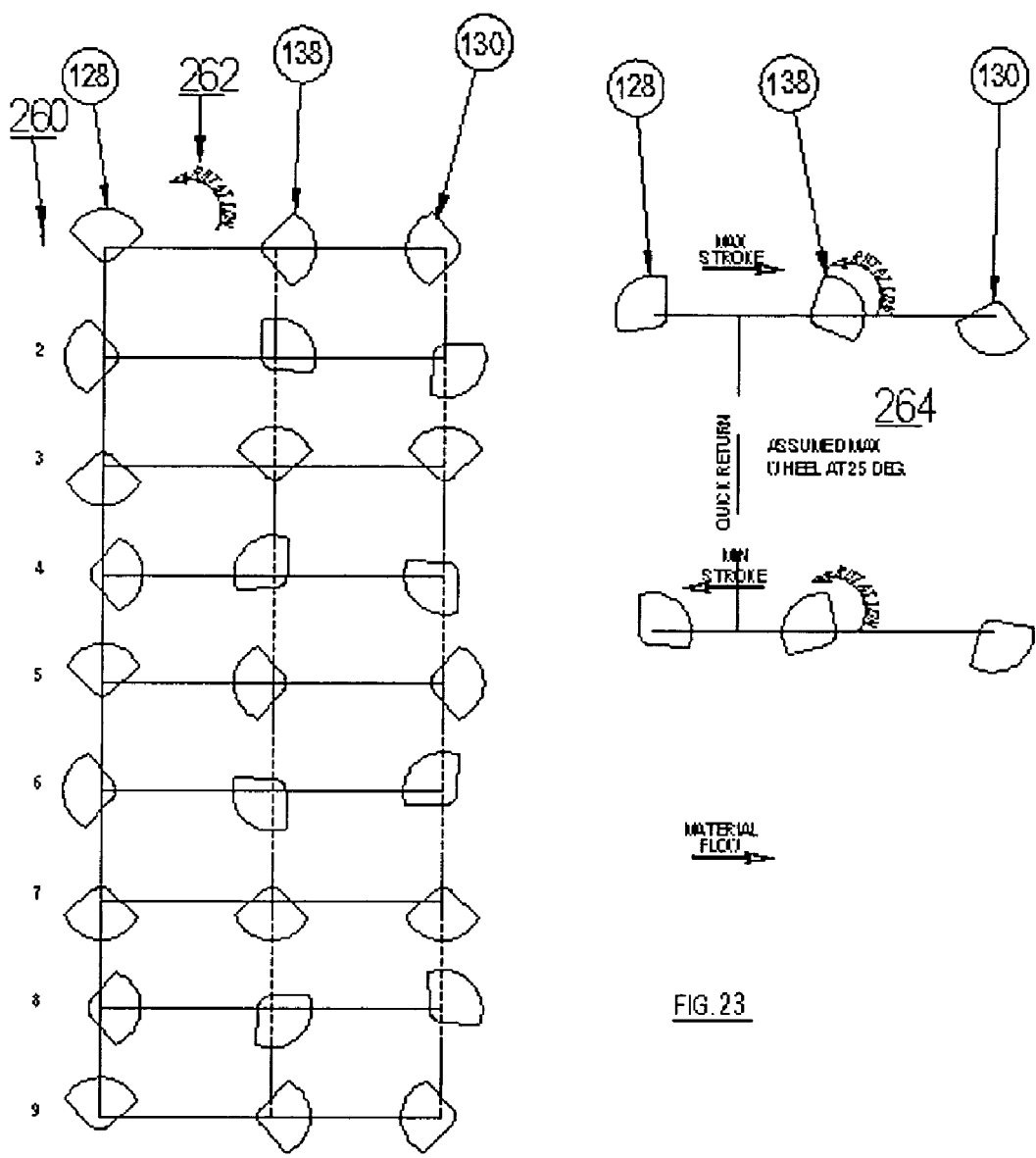
FIG. 23 is a depiction of the counterweight wheel positions every 45 degree rotation of primary, 90 degree of secondary and 135 degree of third stage of counterclockwise rotation and forward material flow.
Figure 24:
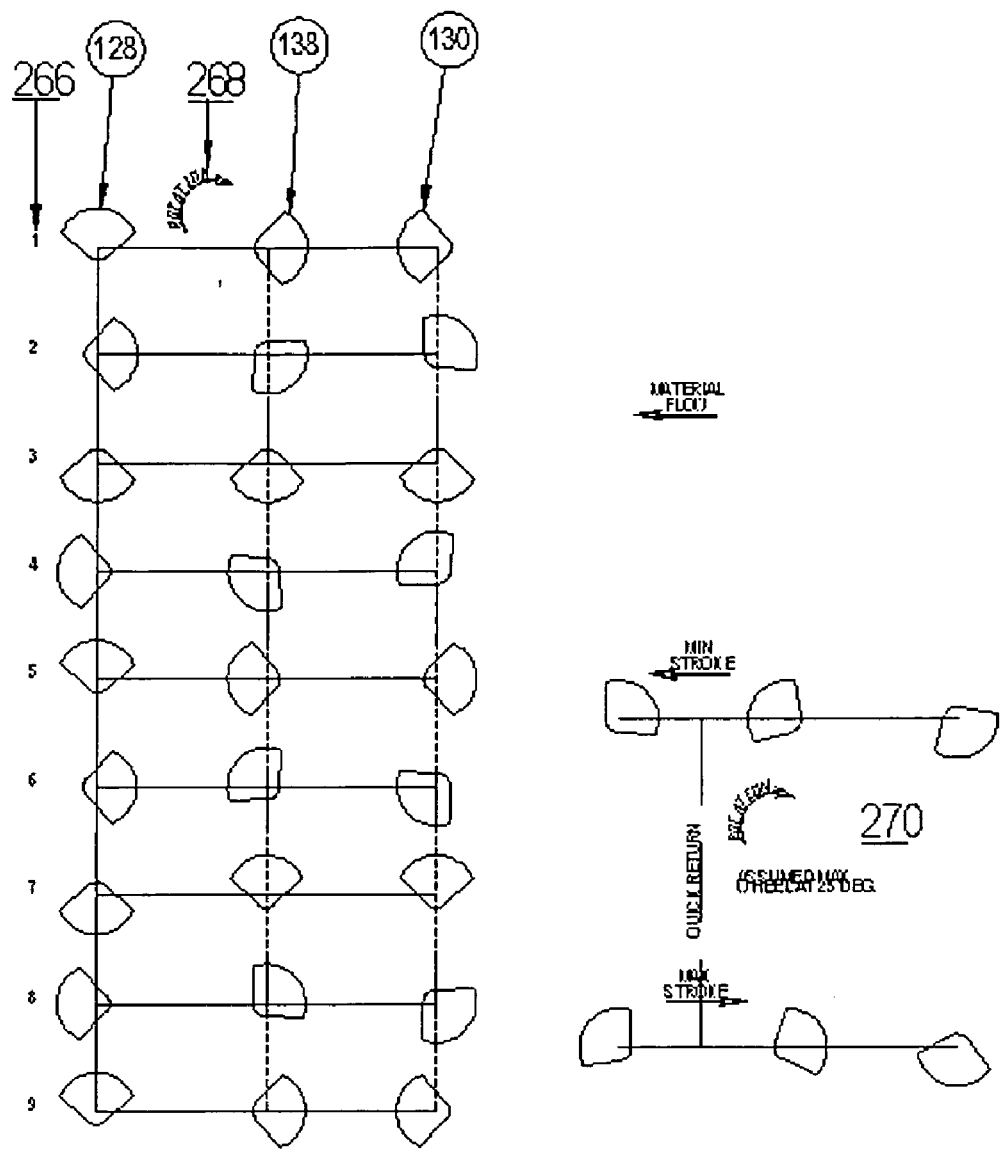
FIG. 24 is a depiction of the counterweight wheel positions every 45 degree rotation of primary, 90 degree of secondary and 135 degree of third stage of clockwise rotation and reverse material flow.
Figure 25:
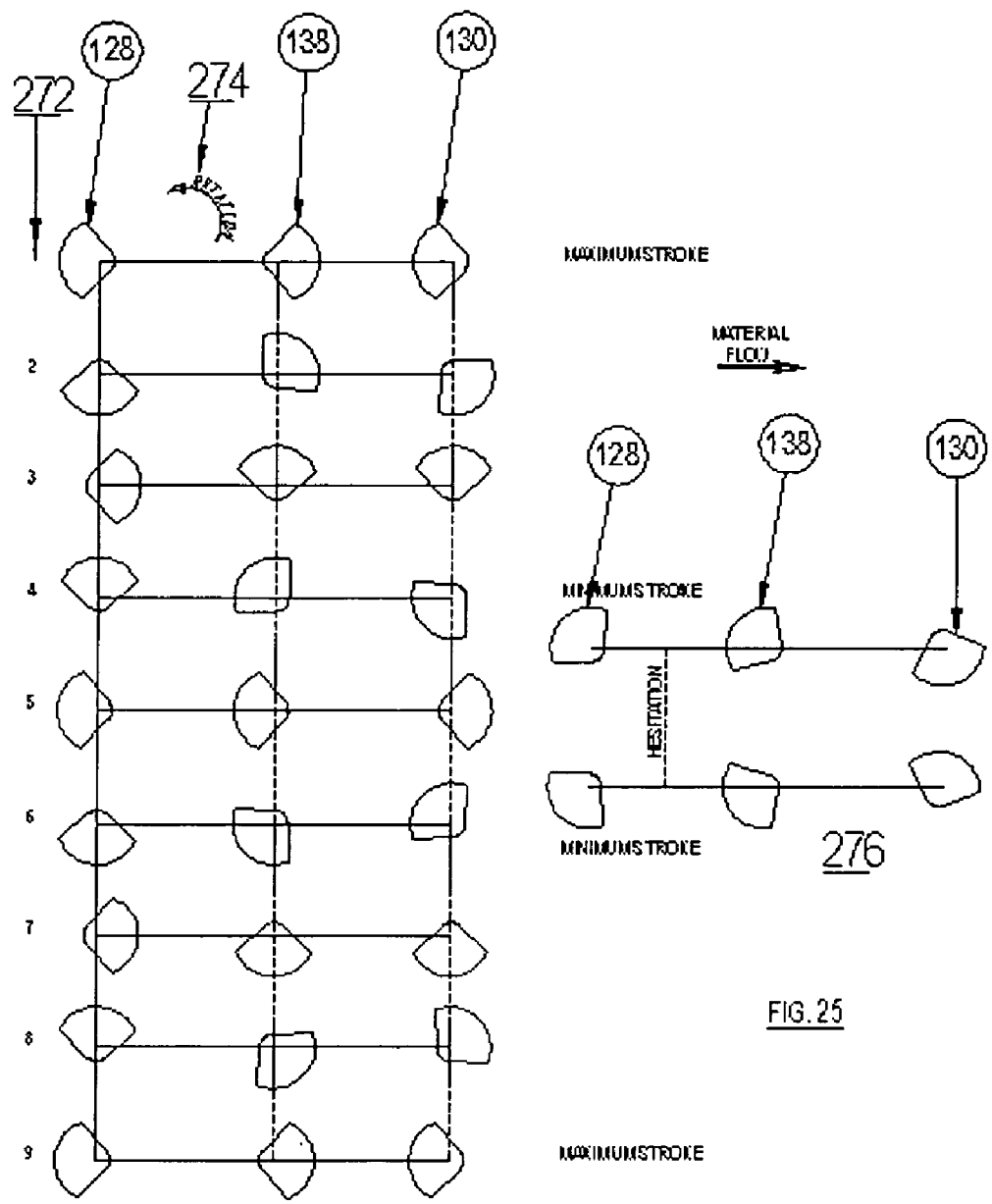
FIG. 25 is a depiction of the counterweight wheel positions every 45 degree rotation of primary, 90 degree of secondary and 135 degree of third stage of counterclockwise rotation and maximum forward material flow.
Figure 26:
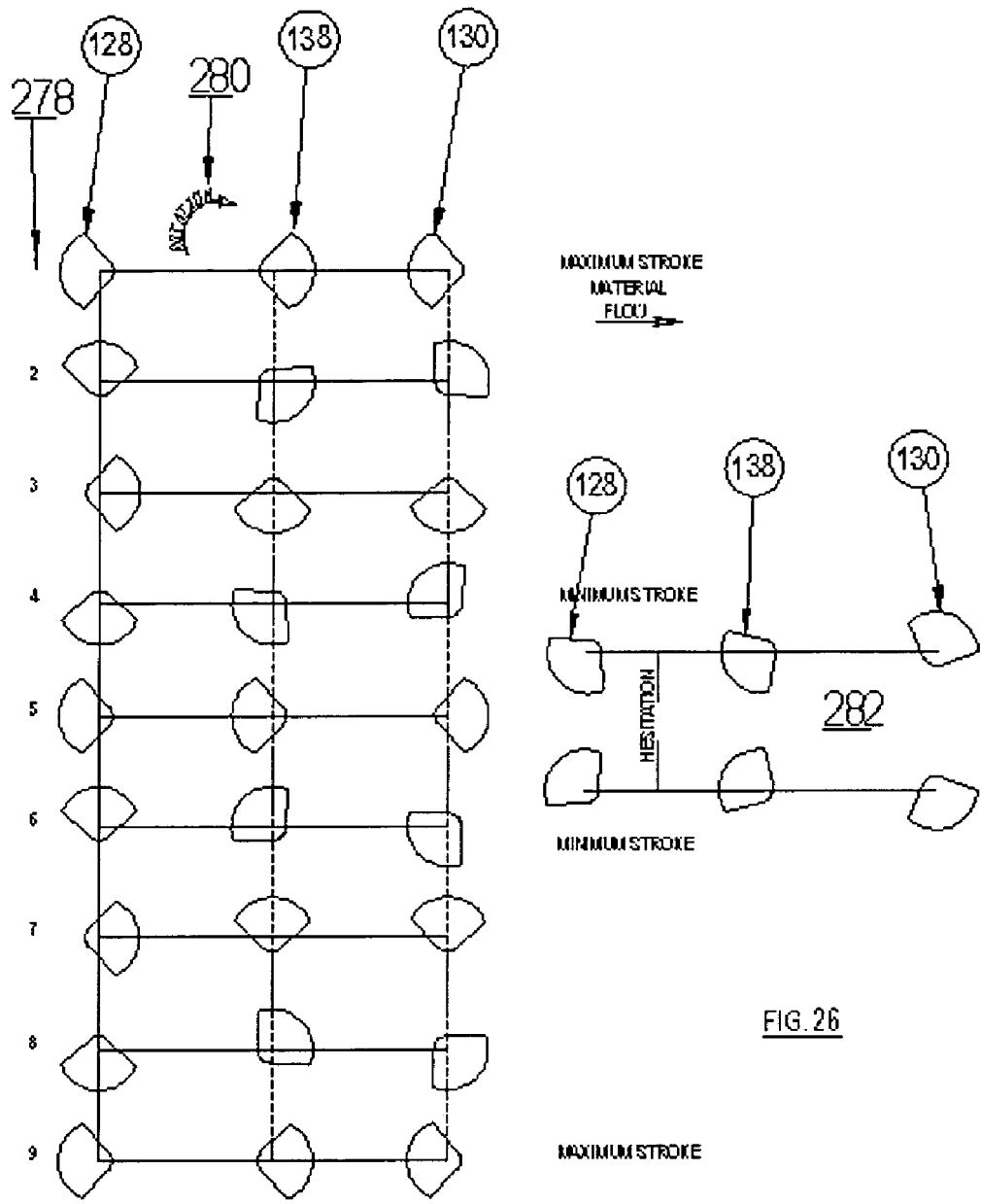
FIG. 26 is a depiction of the counterweight wheel positions every 45 degree rotation of primary, 90 degree of secondary and 135 degree of third stage of clockwise rotation and maximum reverse material flow.

This lagging/leading 90° and 180° offset is best illustrated with respect to FIGS. 23 and 24 respectively. FIG. 23 shows a step-wise representation 260 of the relative positions of the primary 138, secondary 128 and third 130 eccentric counterweights for every 90° counter-clockwise rotation 262 of the secondary counterweights 128. The phase illustration 264 to the right of the nine-step series 260 shows the positions of the wheels where the maximum strokes occur when material flow is from left to right. Similarly, FIG. 24 shows a step wise representation 266 of the relative positions of the primary 138, secondary 128 and third 130 eccentric counterweights for every 90° clockwise rotation 268 of the secondary eccentric counterweights 128. The phase illustration 270 to the right of the nine-step series 266 shows the positions of the wheels where the maximum strokes occur when the material flow is from right to left.

As FIGS. 23 and 24 relate to the wheel arrangement of FIGS. 10, 12a and 17, FIGS. 25 and 26 relate to the wheel arrangement of FIG. 12b. More particularly, FIGS. 25 (and 26) shows a step-wise representation 272 (278) of the relative positions of the primary 138, secondary 128 and third 130 eccentric counterweights for every 90° counter-clockwise (clockwise) rotation 274 (280) of the secondary counterweights 128. The phase illustration 276 (282) to the right of the nine-step series 272 (278) shows the positions of the wheels where the minimum strokes occur during movement hesitation from left to right.

It will be appreciated that a balanced flat-stroke bi-directional conveyor made according to the principles of the alternate embodiments of the present invention provides additional advantages over the prior art. For example, with the described balanced trough, there is no increase of vertical g's, and, therefore, delicate material can be handled with no resulting damage. This has large benefits in such a range of industries from food processing delicate materials (i.e. potato chips) to foundries (i.e. castings) where damage is a problem with conventional vibratory equipment. Non-granular materials are difficult to move on conventional vibration conveyors because of the negative pressure created between the trough and material on the down stroke restricting material flow. Also, the inherent characteristic of non-granular fine material becoming airborne creates a hazardous dust situation. Because there is no down stroke with the balanced conveyor, these problems are alleviated. In addition, the ability to reverse flow enables new possibilities for minimizing the quantity of machines required to complete a process as well as utilizing the process even more efficiently.

It will therefore be appreciated that a flat-stroke bi-directional conveyor made according to the principles of the present invention provides considerable advancements over the aforementioned deficiencies of the prior art.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true sprit and scope of the invention.

I claim:

1. A flat stroke conveyor, comprising:
   a generally horizontal elongated conveying surface;
   a base;
   a plurality of resilient supports generally connecting said conveying surface at said base;
   a balance member connected to said base by some of said resilient supports;
   a pivot arm assembly independently connecting said conveying surface with said base and said balancer with said base; and
   a drive assembly having a motor and a plurality of eccentric weight shafts, said drive assembly coupled to said conveying surface through said pivot arm assembly to provide a cyclic vibratory force to said conveying surface in the form of a skewed sine wave when said motor rotates said shafts.

2. A flat stroke conveyor as defined in claim 1, wherein said resilient supports are vertical slat reactor springs.

3. A flat stroke conveyor as defined in claim 1, wherein said resilient supports are horizontal coil reactor springs.

4. A flat stroke conveyor as defined in claim 1, wherein said resilient supports are sized such that a total spring rate sets a single mass natural running frequency of said conveying surface at about seven percent over a primary running frequency.

* * * * *